Feb. 24, 1948.     H. P. GREENE     2,436,692
TOOL OPERATING ATTACHMENT
Filed March 19, 1945

HARRY R. GREENE.
INVENTOR.
BY Altsch & Knoblock
ATTORNEYS.

Patented Feb. 24, 1948

2,436,692

UNITED STATES PATENT OFFICE 2,436,692

TOOL OPERATING ATTACHMENT

Harry R. Greene, South Bend, Ind.

Application March 19, 1945, Serial No. 583,464

2 Claims. (Cl. 29—74)

This invention relates to a tool operating attachment for use on a machine having a rotating arbor or shaft.

One object of the device is to provide an attachment adapted to be mounted on a machine having a rotating shaft to be driven by said shaft for the purpose of operating a reciprocating tool.

A further object is to provide a simple inexpensive attachment which can be connected to and detached from a machine very readily and to which a reciprocating tool can be connected for operation by the machine.

A further object is to provide a device adapted to be connected to a drill press and operative to actuate a reciprocating tool.

Other objects will be apparent from the description, drawings and appended claims.

Figure 1:
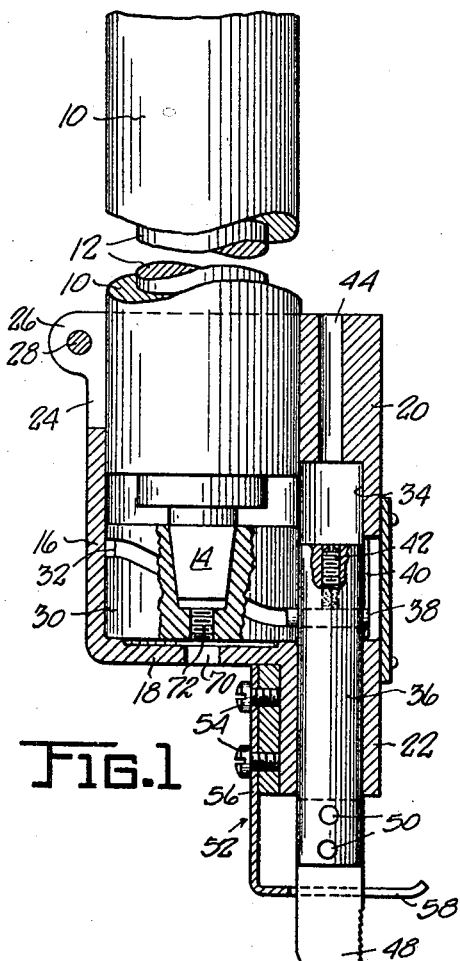
Fig. 1 is a longitudinal vertical sectional view of the adapter applied to the quill of a drill press, and taken on line 1—1 of Fig. 2.
Figure 2:
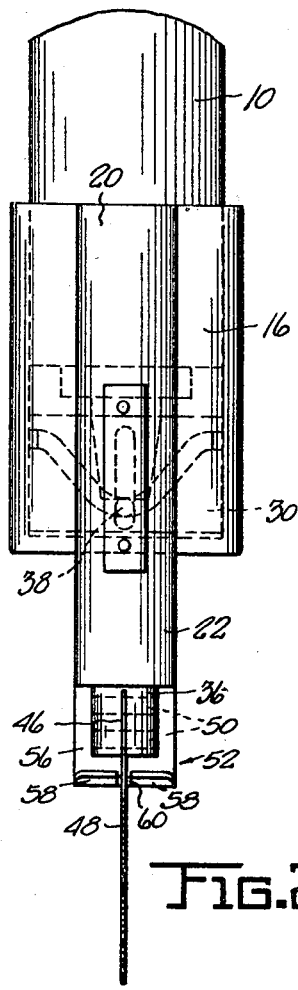
Fig. 2 is a side elevational view of the device.

There are many occasions, in small shops, when need for a reciprocating type of tool arises, but the need for any given type of reciprocating tool arises so seldom that it is not economical to buy a power operated tool of that type. Thus, in many small shops it is necessary to perform a sawing operation from time to time, but the frequency of the need is not great enough to justify the cost of a power operated saw, with the result that a hand saw, such as a hack saw, is used instead. Likewise, it may be necessary to perform riveting and peening operations from time to time, or filing operations. In most of these cases the requirements of the operation are quite severe, or entail substantial application of power. Consequently, inexpensive portable tools are not practical or feasible for such uses. I propose to provide an attachment which can be applied to a machine which has adequate power for the work, such as a drill press, for the purpose of converting it temporarily to the purpose of operating such reciprocating tools.

Referring to the drawing, which illustrates the preferred embodiment of the invention, the numeral 10 designates the quill of a conventional drill press in which a driven spindle or shaft 12 is journaled. The end of the shaft which projects from the quill has the usual tapered and squared or otherwise configured stud 14 to which a chuck or other member (not shown) adapted to mount a drill (not shown) is customarily connected. It will be understood that these parts are conventional parts of a drill press of any type or style.

I mount my new tool attachment upon the quill 10. The housing 16 or frame of the attachment is cylindrical in shape or outline, and has a bottom 18. The housing includes an integral projection 20 extending longitudinally along one side thereof and projecting below the bottom in the form of a tubular portion 22. The housing has a cylindrical bore which is adapted to fit snugly and slidably upon the quill. At a point diametrically opposite the projection 20 the housing is provided with a longitudinal slot 24. At its upper end, a pair of lugs or bosses 26 are formed integrally with the housing at oposite ends of slot 22. The bosses are centrally apertured and one thereof is internally screw-threaded. A clamping screw 28 fits in said apertures and serves to draw the bosses together to securely clamp or fasten the housing on the quill.

A cylindrical member 30 is journaled within the housing at the lower end thereof. Member 30 has a socket therein conforming to the shape of and adapted to receive the stud 14 of drive shaft 12 with a snug driving fit. The outer periphery of member 30 is interrupted by an endless circumferential groove 32 which preferably extends in a plane disposed angularly to the end surfaces of said member.

The projection 20 of the housing 16 has a bore 34 therein forming a continuation of the bore of tubular portion 22 and communicating with the bore or interior of the cylindrical housing portion 16. An elongated ram 36 has a snug sliding fit in bore 32 and tubular portion 22. A pin 38 extends transversely through the ram, and the opposite ends of the pin project from the ram. The inner projecting end of pin 38 has a snug sliding fit in the cam groove 32. A longitudinal slot 40 in the projection 20 aligned with the center or axis of the ram 36 and member 30 receives the outer end of pin 38 with a snug sliding fit. A set screw 42 is received in a longitudinal bore in the upper end of the ram and bears against the pin 38 to lock it in proper position and against endwise displacement. The slot 40 may be closed by a plate secured to the housing and spanning the slot, if desired. A reduced bore 44 in the upper portion of the projection 20 affords access to the set screw by means of a screw driver.

The lower end of the ram 36 projects from the tubular housing member 22 and has a narrow central slot 46 therein. Slot 46 is of a width to snugly receive one end of a short saw blade 48. This blade may be a hack saw blade or any other type of blade, and is preferably of a width not greater than the diameter or width of the ram. Two or more screws 50 fit in aligned apertures in the forks of the ram transverse of the slot and pass through apertures in the blade. Screws 50 serve the dual function of maintaining the alignment of the blade with the ram and of clamping the slot-defined jaws at the end of the ram upon the blade. The ends of the screws are either flush with or inset relative to the ram to avoid interference with reciprocation of the ram.

A bracket 52 is secured or formed as a part of the tubular housing projection 22 at the inner side thereof. A hold-down fixture is secured to the bracket by screws 54. The fixture preferably comprises a rigid metal strap having a vertical portion 56 bearing against and secured to bracket 52 and a horizontal foot portion 58 at its lower end which is slotted at 60 to permit the saw blade to pass freely therethrough. The foot portion 58 terminates in forwardly or outwardly spaced relation to the saw blade.

In the use of the device it is only necessary to apply the housing 16 upon the quill 10, making certain that stud 14 fits firmly into the socket of member 30, and then to tighten the clamping screw 28. Assuming that the attachment is provided with a saw blade 48, the device is ready for use. The work piece is positioned upon a suitable support carried by the work table of the drill press, and the quill 10 is lowered until the outer end of the foot 58 engages the top of the work. The machine is then energized to rotate the spindle 12. The spindle rotates member 30 therewith. As member 30 rotates the cam groove 32 imparts reciprocating movement to the ram 36 through the pin 38, and thereby operates or reciprocates the saw blade 48. The work piece can then be advanced or fed to the saw blade.

It will be observed that it is possible to vary the shape of the cam to provide more than one reciprocation of the ram and blade for each revolution of member 30. Likewise, the device possesses all of the advantages of sturdiness, rigidity, power and convenience which characterize a drill press, and consequently avoids the vibration and limited power which commonly characterize portable power tools. The hold-down member simplifies the sawing operation, and is readily operable by virtue of the fact that the quill of a drill press is necessarily shiftable vertically. This characteristic of the drill press also makes it possible to mount the work upon a fixed support and to move the saw vertically into and out of operative engagement with the work.

In the event that the tapered stud 14 is so tightly wedged in the socket of the member 30 as to resist separation of the parts when it is desired to remove the attachment from the quill 10 of the drill press, forcible separation can be accomplished by inserting a threaded member (not shown) through the central opening 70 in the end wall 18 of the housing 16 and threading the same in the screw-threaded bore 72 in the member 30 registering with the opening 70, so that the end of the threaded member will extend into the socket in the member 30 and bear against the end of the stud 14. Rotation of the threaded member will then unseat the stud 14 from the member 30.

Figure 3:
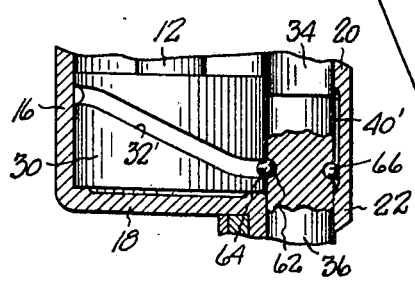
Fig. 3 is a fragmentary detail sectional view illustrating a modified embodiment of the invention.

A modified form of the invention is illustrated in Fig. 3. In this embodiment the groove 32' of member 30 is arcuate in cross-section and semi-circular in cross-sectional extent. The ram 36 has a semi-spherical recess 62 therein facing the member 30. A ball or sphere 64 fits into recess 62 and groove 32' and serves to transmit or translate the rotary movement of member 30 into reciprocating movement of the ram. Ball 64 will preferably have a snug but free tuning fit in said groove and recess to reduce friction to a minimum. Likewise, a second semi-spherical recess may be formed in the ram to rotatably receive therein a ball 66 which projects into a keyway or groove 40' in the housing wall, which may also be of semi-circular cross-sectional shape. The advantage of this form of construction lies in the improved running action of the parts and reduction of danger of the parts binding.

While the device has been illustrated and described as a sawing attachment, its use is not limited thereto. Thus, by simply providing proper attachment means upon the ram, a file, a riveting head, a peening head or any other tool element of the reciprocating or hammering type may be mounted thereon and used with the same facility. The hold-down member used in each case will be shaped and constructed as required, or may be eliminated entirely.

I claim:

1. An attachment for a drill having a cylindrical quill and a shaft journaled in said quill and provided with a head projecting from said quill and concentric therewith, comprising a rigid unitary housing having a cylindrical bore open at one end, said housing being longitudinally split for a portion of its length at said end and adapted to fit snugly on the quill, means for contracting the split portion of said housing for clamping said housing around said quill, a longitudinally extending lateral projection formed integrally with said housing and having a longitudinal bore extending continuously therethrough and communicating with said first bore at a portion only of its length, a cylindrical member of substantially the diameter of said first bore loosely received therein and provided with a head receiving socket positioned axially thereof and opening toward said open end of said first bore and a cam slot around its periphery, a ram mounted for limited reciprocation in said second bore, projecting from the opposite end of said housing and having a cam follower seated in said cam slot for operating said ram by said cylindrical member and for restraining said cylindrical member in said first bore, and tool mounting means on the projecting end of said ram, said housing, cylindrical member, ram and cam follower constituting an assembly whereby the simple application of said housing to said quill positions the head in said socket to provide a journal and drive for said cylindrical member and the manipulation of said clamping means attaches said housing to said quill and secures said head and member in operative position.

2. An attachment of the character defined in claim 1, wherein the closed end of said housing has a central opening therein communicating with said bore and the inner end of said cylindrical member has a threaded opening registering with said housing opening and communicating with said socket and adapted to receive a tool for dislodging said head from said socket.

HARRY R. GREENE.

REFERENCES CITED

The following references are of record in the file of this patent:

UNITED STATES PATENTS

| Number | Name | Date |
|---|---|---|
| 704,810 | Locke | July 15, 1902 |
| 1,406,071 | Pavelka | Feb. 7, 1922 |
| 1,542,127 | Hastings | June 16, 1925 |
| 1,679,884 | Thomas | Aug. 7, 1928 |
| 1,763,500 | Bowen | June 10, 1930 |
| 1,808,228 | Hulack | June 2, 1931 |
| 1,866,529 | Farkas | July 12, 1932 |
| 1,871,020 | Wyzenbeek | Aug. 9, 1932 |
| 2,240,755 | Briggs | May 6, 1941 |
| 2,282,728 | Kern | May 12, 1942 |

FOREIGN PATENTS

| Number | Country | Date |
|---|---|---|
| 42,463 | Denmark | June 23, 1930 |